United States Patent [19]
Kimura et al.

[11] Patent Number: 5,584,959
[45] Date of Patent: Dec. 17, 1996

[54] WASTE TREATMENT SYSTEM IN A POLISHING APPARATUS

[75] Inventors: Norio Kimura; Katsuyuki Aoki; Kiyotaka Kawashima; Seiji Ishikawa, all of Tokyo, Japan

[73] Assignee: Ebara Corporation, Tokyo, Japan

[21] Appl. No.: 291,530

[22] Filed: Aug. 16, 1994

[30] Foreign Application Priority Data

Aug. 16, 1993 [JP] Japan ................................. 5-223846
Aug. 17, 1993 [JP] Japan ................................. 5-225202

[51] Int. Cl.$^6$ ................................................. H01L 21/00
[52] U.S. Cl. .................... 156/345; 156/636.1; 156/642.1
[58] Field of Search ............................ 156/345, 636.1, 156/642.1; 216/88, 89, 93

[56] References Cited

U.S. PATENT DOCUMENTS

| | | | |
|---|---|---|---|
| 4,203,835 | 5/1980 | Tagashira et al. | 210/673 |
| 4,372,805 | 2/1983 | Takahashi et al. | 216/93 |
| 5,032,203 | 7/1991 | Doy et al. | 156/345 |
| 5,118,286 | 6/1992 | Sarin | 432/2 |
| 5,211,843 | 5/1993 | Wester et al. | 216/93 X |

FOREIGN PATENT DOCUMENTS 0544469 6/1993 European Pat. Off. .
51-36759 3/1976 Japan .
62-22055 2/1987 Japan .
2-207527 8/1990 Japan .
3-294166 12/1991 Japan .

OTHER PUBLICATIONS

Patent Abstracts of Japan, vol. 15, No. 143 (E-1054), Apr. 11, 1991.
Patent Abstracts of Japan, vol. 16, No. 110 (C-920) [5153], Mar. 18, 1992.

*Primary Examiner*—Thi Dang
*Attorney, Agent, or Firm*—Wenderoth, Lind & Ponack

[57] ABSTRACT

A waste treatment system in a polishing apparatus treats waste gas and waste liquid discharged from the polishing apparatus. The waste treatment system comprises an exhaust duct provided in a partition wall enclosing the polishing apparatus, a scrubber connected to the exhaust duct through an exhauster for scrubbing waste gas discharged from the polishing apparatus, a waste liquid receiver provided below an abrasive cloth of the polishing apparatus for receiving waste liquid generated by a polishing operation and a waste liquid treatment apparatus connected to the waste liquid receiver for treating the waste liquid discharged from the polishing apparatus.

28 Claims, 2 Drawing Sheets

WASTE TREATMENT SYSTEM IN A POLISHING APPARATUS

BACKGROUND OF THE INVENTION

1. Field of the Invention:

The present invention relates to a waste treatment system in a polishing apparatus, and more particularly to a waste treatment system in which waste gas and waste liquid discharged from a polishing apparatus can be treated.

2. Description of the Related Art:

Recent rapid progress in semiconductor device integration demands smaller and smaller wiring patterns or interconnections and also narrower spaces between interconnections which connect active areas. One of the processes available for forming such interconnection is photolithography. Though the photolithographic process can form interconnections that are at most 0.5 µm wide, it requires that surfaces on which pattern images are to be focused on by a stepper be as flat as possible because the depth of focus of the optical system is relatively small.

It is therefore necessary to make the surfaces of semiconductor wafers flat for photolithography. One customary way of flattening the surfaces of semiconductor wafers is to polish them with a polishing apparatus.

Conventionally, such a polishing apparatus has not been installed in a clean room because dust particles and harmful gas are generated by the polishing operation of the polishing apparatus. Therefore, semiconductor wafers are transported into the clean room by means of a wafer carrier after they are polished by the polishing apparatus installed outside the clean room, and then the semiconductor wafers are processed to form device layers by processing apparatuses installed in the clean room.

However, as described above, high integration in a semiconductor device demands the semiconductor wafer to be multilayer, it is therefore necessary to make each surface of the multilayer flat for photolithography. In order to increase the productivity of the semiconductor device, the polishing apparatus is required to be installed in the clean room of a semiconductor manufacturing plant.

In the polishing apparatus, abrasive liquid is supplied from a nozzle onto an abrasive cloth attached to an upper surface of a turntable. The abrasive liquid contains abrasive material such as silicon dioxide ($SiO_2$) or cerium dioxide ($CeO_2$) having a diameter of 1 µm or less in a liquid.

Further, in order to perform chemical polishing in addition to mechanical polishing, acid or alkali may be added to the abrasive liquid. In this case, acid waste gas or alkaline waste gas are liable to be discharged from the polishing apparatus.

However, since a conventional polishing apparatus is not provided with a waste gas treatment apparatus, acid waste gas or alkaline waste gas discharged from the polishing apparatus pollutes air in the clean room and is a serious cause of lowering the yield of the semiconductor devices.

Further, waste liquid discharged from the polishing apparatus contains abrasive material and particles generated by the polishing operation. Because discharge of such waste liquid containing abrasive material and particles generated by the polishing operation causes environmental pollution, it is therefore necessary to make the waste liquid clean and to discharge clean liquid from the polishing apparatus.

SUMMARY OF THE INVENTION

It is therefore an object of the present invention to provide a waste treatment system in a polishing apparatus in which waste gas and waste liquid discharged from the polishing apparatus can be treated.

According to the present invention, there is provided a waste treatment system in a polishing apparatus for treating waste gas and waste liquid discharged from the polishing apparatus which polishes a semiconductor wafer by contacting the semiconductor wafer with an abrasive cloth while supplying an abrasive material onto the abrasive cloth, the waste treatment system comprising: an exhaust duct provided in a partition wall enclosing the polishing apparatus, the exhaust duct having at least one opening which is open in the polishing apparatus; a scrubber connected to the exhaust duct through an exhauster for scrubbing waste gas discharged from the polishing apparatus; a waste liquid receiver provided below the abrasive cloth for receiving waste liquid generated by a polishing operation; and a waste liquid treatment apparatus connected to the waste liquid receiver for treating the waste liquid discharged from the polishing apparatus.

According to the present invention, waste gas discharged from the polishing apparatus is supplied to the scrubber and treated therein. Therefore, the polishing apparatus can be installed in the clean room because a problem of waste gas is solved. Further, waste liquid discharged from the polishing apparatus can be sufficiently and efficiently treated.

By waste gas treatment and waste liquid treatment, solid particles containing abrasive material and particles generated by a polishing operation, and chemical liquid and mist thereof are prevented from being discharged or scattered into the clean room. Thus environmental conservation is sufficiently obtainable.

According to one aspect of the present invention, since clearing solvent in the clearing solvent tank of the scrubber is discharged into the waste liquid treatment apparatus and treated, the clearing solvent containing solid particles such as abrasive material and particles generated by polishing operation can be appropriately treated. Consequently, treatment process of the clearing solvent of the scrubber is not required separately and independently, thus lowering construction and running costs of total system and saving installation space for the total system.

In the waste liquid discharged from the chemical mechanical polishing (CMP) process, there exists gas dissolved in the waste liquid and containing the same components as the waste gas discharged from the polishing apparatus. Therefore, such components are separated from the waste liquid in the waste liquid chamber to genarate exhaust gas. However, in the present invention, exhaust gas generated in the waste liquid chamber of the waste liquid treatment apparatus is supplied into the scrubber and treated.

According to another aspect of the present invention, a damper is provided in the exhaust duct of the polishing apparatus and controlled so as to be closed while a semiconductor wafer is transferred to a next process such as a washing process after finishing of the polishing operation and another semiconductor wafer is not polished.

Therefore, abrasive liquid adhering to the polishing surface of the semiconductor wafer is prevented from drying because a stream of air created around the semiconductor wafer is stopped. At the same time, the abrasive cloth on the turntable is prevented from drying, and irregularity of the polishing rate caused by adhesion of abrasive liquid on the abrasive cloth can be eliminated.

The above and other objects, features, and advantages of the present invention will become apparent from the following description of illustrative embodiments thereof in conjunction with the accompanying drawings.

DETAILED DESCRIPTION OF THE PREFERRED EMBODIMENTS

A waste treatment system in a polishing apparatus will be described below with reference to FIG. 1.

Figure 1:
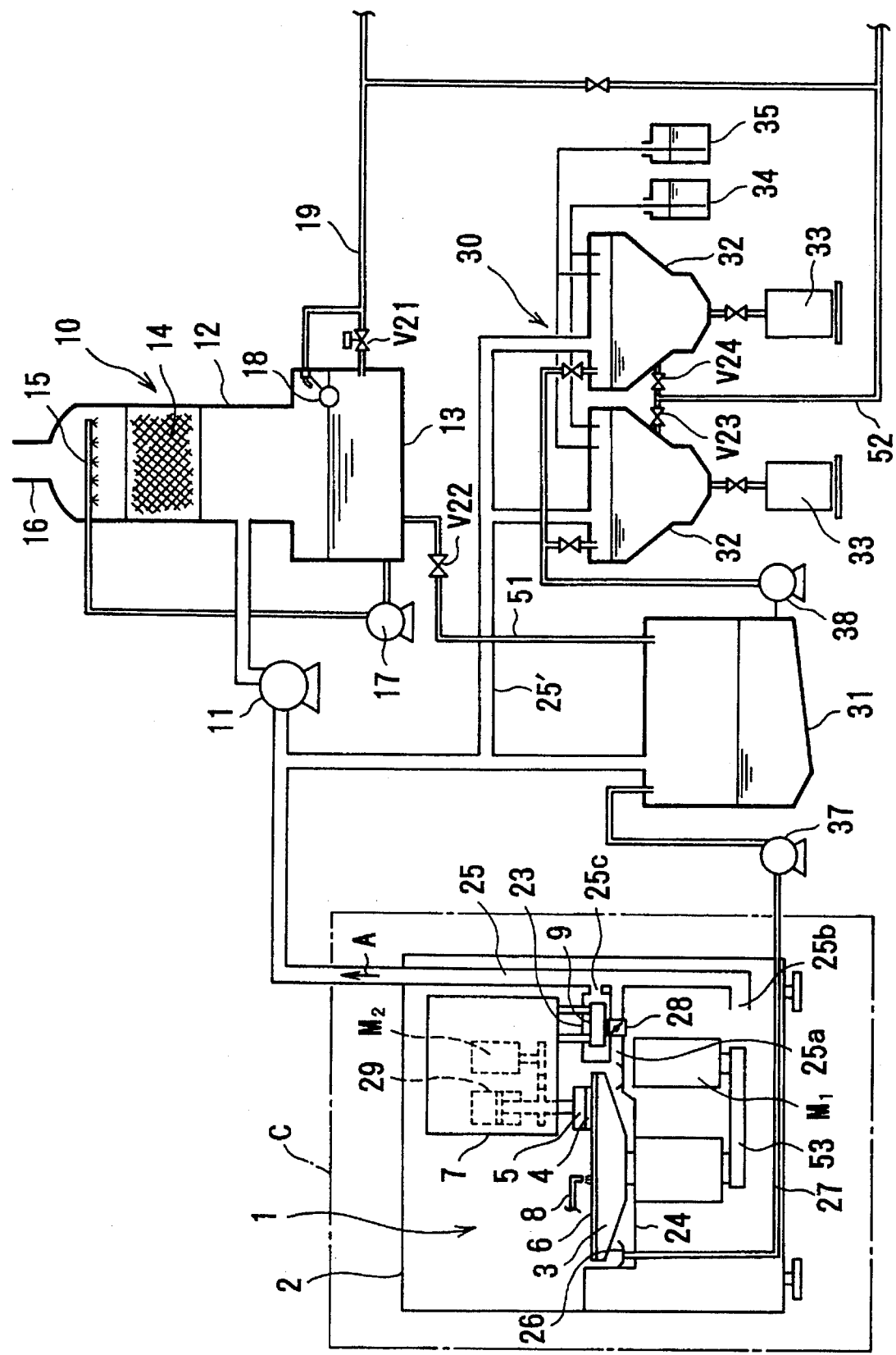
FIG. 1 is a schematic view of a waste treatment system in a polishing apparatus according to an embodiment of the present invention.

FIG. 1 is a schematic view showing a whole structure of the waste treatment system of the present invention. As shown in FIG. 1, a polishing apparatus 1 is installed in a clean room C. The polishing apparatus 1 is enclosed with the partition wall 2 which prevents gas and particles generated by a polishing operation from being scattered in the clean room C. An exhaust duct 25 is disposed in the partition wall 2 to discharge waste gas from the polishing apparatus 1 into a waste gas treatment apparatus 10.

The polishing apparatus 1 comprises a turntable 3 and a top ring 5 for holding a semiconductor wafer 4 and pressing the semiconductor wafer 4 against the turntable 3. The turntable 3 is coupled to a motor $M_1$ through a belt 53. An abrasive cloth 6 is attached to an upper surface of the turntable 3. The top ring 5 is supported by a top ring head 7 which is provided with a motor $M_2$ for rotating the top ring 5 and an air cylinder 29 for moving the top ring 5 vertically, whereby the top ring 5 is movable up and down and rotatable about an axis of the top ring 5. The top ring 5 is swingable in a horizontal plane by a swinging mechanism 9. An abrasive liquid containing abrasive material such as silicon dioxide ($SiO_2$) or cerium dioxide ($CeO_2$) is supplied from a nozzle 8 onto the upper surface of the abrasive cloth 6.

The polishing apparatus 1 of the above structure can polish various objects such as semiconductor wafers by selecting a combination of abrasive material and diluent properly. For example, in the case of polishing silicon dioxide deposited on a silicon substrate, abrasive liquid containing abrasive material consisting of colloidal silica in potassium hydroxide (KOH) solution is typically used. In the case of polishing a metal layer such as aluminum on a substrate, abrasive liquid containing nitric acid ($HNO_3$) solution or sulfuric acid ($H_2SO_4$) solution is often used.

Other abrasive liquid is used in accordance with the objects to be polished. In general, abrasive liquid containing hard abrasive material in acid solution or alkaline solution is used. Therefore, acid waste gas or alkaline waste gas is contained in waste gas. Acid solution or alkaline solution, and abrasive material and particles generated by the polishing operation are contained in the waste liquid. Since the turntable 3 and the top ring 5 are rotated during polishing, abrasive liquid is scattered and forms mist. Nitric acid or sulfuric acid which is often used to polish a metal layer is reacted with metal, thereby producing nitrogen oxide (NO) or sulfur oxide ($SO_2$). Therefore, waste gas and waste liquid discharged from the polishing apparatus are required to be treated in accordance with the present invention.

A waste liquid receiver 26 for receiving waste liquid is provided around the turntable 3 and below the abrasive cloth 6. The waste liquid receiver 26 is connected to a waste liquid treatment apparatus 30 through a waste liquid pipe 27. A partition wall 24 is disposed below the turntable S to divide an interior space of the polishing apparatus 1 into a polishing chamber and a chamber for accommodating a turntable driving mechanism such as the motor $M_1$. The exhaust duct 25 has a first opening 25a which is open at the polishing chamber and a second opening 25b which is open in the chamber for accommodating the driving mechanism. The swinging mechanism 9 is covered with a cover 23 whose interior space is communicated with a third opening 25c of the exhaust duct 25 to evacuate the interior space of the cover 23 independently. A damper 28 is provided in the first opening 25a of the exhaust duct 25.

Next, the waste gas treatment apparatus 10 for treating waste gas discharged from the polishing apparatus 1 will be described in detail.

The waste gas treatment apparatus 10 is provided with a scrubber 12 into which waste gas A discharged from the polishing apparatus 1 is introduced by a fan 11 constituting an exhauster provided at the intermediate portion of the exhaust duct 25. The scrubber 12 has a clearing solvent tank 13 at the lower portion thereof, a filling 14 at the intermediate portion thereof, a liquid spraying pipe 15 at the upper portion thereof and a gas discharging pipe 16 at the uppermost portion thereof. Clearing solvent such as water in the clearing solvent tank 13 is supplied to the liquid spraying pipe 15 by a circulating pump 17. A liquid level in the clearing solvent tank 13 is detected by a level sensor 18 and clearing solvent is supplied into the clearing solvent tank 13 through a pipe 19 so that a liquid level in the clearing solvent tank 13 is kept constant. Further, by operating a valve V21 manually, clearing solvent such as water can be supplied into the clearing solvent tank 13 through the pipe 19.

The waste gas treatment apparatus 10 of the above structure operates as follows: the clearing solvent such as water in the clearing solvent tank 13 is sprayed over the filling 14 through the liquid spraying pipe 15 by operating the circulating pump 17. The waste gas A discharged from the polishing apparatus 1 is introduced into a chamber in the scrubber 12 defined under the filling 14 by operating the fan 11. Harmful gas or mist such as ammonia ($NH_3$) or $HNO_3$ contained in the waste gas is dissolved into the clearing solvent when passing through the filling 14 and drops into the clearing solvent tank 13. Harmless neutral gas from which harmful gas or mist is removed is discharged from the gas discharging pipe 16.

When a certain amount of harmful gas or mist such as $NH_3$ or $HNO_3$ is dissolved in the clearing solvent in the clearing solvent tank 13 and concentration of the dissolved components increases up to a predetermined value, clearing solvent is discharged from the clearing solvent tank 13 into a buffer vessel 31 through a pipe 51 by opening a valve V22.

In the above waste gas treatment process, the damper 28 provided in the first opening 25a is controlled so as to be closed while a semiconductor wafer is transferred to a next process such as a washing process after finishing of the polishing operation and another semiconductor wafer is not polished. Abrasive liquid which adheres to the polishing surface of the semiconductor wafer 4 after finishing of the polishing operation may dry up. If the abrasive liquid drys on the semiconductor wafer 4, it is difficult to remove abrasive material and particles from the polished surface of the semiconductor wafer 4.

By the gas treatment process of the present invention, a stream of air is created around the semiconductor wafer 4, and the abrasive liquid on the semiconductor wafer 4 is liable to dry. In order to avoid drying of the abrasive liquid, the damper 28 is controlled so as to be closed to stop the stream of air around the semiconductor wafer 4 and prevent the abrasive liquid from drying while the semiconductor wafer 4 is transferred to a next process after finishing of the polishing operation. At the same time, the abrasive cloth 6 on the turntable 3 is prevented from drying, and irregularity of the polishing rate caused by adhesion of abrasive liquid on the abrasive cloth 6 can be eliminated, and thus the yield of semiconductor devices increases.

Next, a controlling method of the damper 28 will be described below in detail.

While the turntable 3 is being rotated, the damper 28 is kept open to evacuate waste gas or mist generated by polishing operation. On the other hand, while the turntable 3 is stopped, that is, polishing is not performed, the damper 28 is closed. By controlling opening and closing of the damper 28 synchronously with the turntable 3, the abrasive liquid adhering to the polished surface of the semiconductor wafer 4 and the abrasive cloth 6 are prevented from drying.

The damper 28 may be opened or closed in synchronization with lifting or lowering of the top ring 5, or starting or stopping of a swinging motion of the top ring 5. Alternatively, opening or closing of the damper 28 may be controlled in synchronization with starting or stopping the supply of abrasive liquid.

In the above embodiment, the clearing solvent is circulated in the scrubber 12 by the circulating pump 17. However, the scrubber 12 may be charged with activated charcoal as the filling 14, and harmful gas or mist may be adsorbed by the activated charcoal. In this case, it is not necessary to circulate the clearing solvent in the scrubber 12.

Next, the waste liquid treatment apparatus 30 for treating waste liquid discharged from the polishing apparatus 1 will be described below in detail.

The waste liquid treatment apparatus 30 comprises the buffer vessel 31 having a large volume for collecting waste liquid containing abrasive liquid and particles generated by the polishing operation, precipitation chambers 32 for precipitating solid components to separate solid components and liquid components contained in the waste liquid, and concentration chambers 33 for concentrating solid components separated from the waste liquid in the precipitation chamber 32. The waste liquid treatment apparatus 30 further comprises a flocculating agent tank 34 for supplying flocculant for quickening precipitation of solid components into the precipitation chambers 32 and a neutralizer tank 35 for supplying neutralizer into the precipitation chambers 32.

The waste liquid containing abrasive liquid and particles generated by the polishing operation, and waste liquid generated by dressing of the abrasive cloth 6 are collected in the buffer vessel 31 through the waste liquid receiver 26 by operating a waste liquid pump 37. The clearing solvent in the scrubber 12 is also collected in the buffer vessel 31. Mist generated by the polishing operation and containing the abrasive material and particles is introduced into the scrubber 12. As a result, the clearing solvent is caused to contain the abrasive material and particles generated by the polishing operation and the gas treatment process. Therefore, the clearing solvent tank 13 is connected to the buffer vessel 31 through the valve V22 and a pipe 51 so that the same treatment as for the waste liquid discharged from the polishing apparatus 1 is carried out.

The waste liquid in the buffer vessel 31 is supplied into the precipitation chamber 32 by operating a waste liquid pump 38. It takes a considerable amount of time to precipitate solid components in the waste liquid in the precipitation chamber 32. Therefore, in this embodiment, two precipitation chambers 32 are provided in parallel. These two precipitation chambers 32 can be efficiently employed by a batch processing. The flocculant such as poly-aluminum-chloride (PAC) is supplied from the flocculating agent tank 34 into the precipitation chamber 32 to form flocks and quicken precipitation of solid components in the waste liquid, and the neutralizer such as sodium hydroxide (NaOH) is supplied from the neutralizer tank 35 into the precipitation chamber 32 to neutralize the waste liquid. High-molecular coagulant may be added to the waste liquid to make large flocks. As high molecular coagulant, anionic polymer, cationic polymer and nonionic polymer are used. After a lapse of a certain time, liquid components and solid components are separated in the precipitation chamber 32, and supernatant clean liquid is discharged from the precipitation chamber 32 by opening a valve V23 or a valve V24. The solid components which are precipitated in the precipitation chamber 32 are fed to the concentration chamber 33 and concentrated.

According to the present invention, exhaust gas generated in the waste liquid chambers including the buffer vessel 31 and the precipitation chambers 32 is supplied into the scrubber 12 of the waste gas treatment apparatus 10 through the exhaust duct 25'.

In the waste liquid discharged from the chemical mechanical polishing (CMP) process, there exists gas dissolved in the waste liquid and containing the same components as the waste gas discharged from the polishing apparatus 1. Therefore, such components are separated from the waste liquid in the waste liquid chambers 31 and 32 to generate exhaust gas. However, in the present invention, exhaust gas generated in the waste liquid chambers 31 and 32 of the waste liquid treatment apparatus 30 is supplied into the scrubber 12 through the exhaust duct 25' and treated. Further, clean liquid which has been cleaned by the waste liquid treatment apparatus 30 is supplied into the scrubber 12 through a pipe 52 and reused in the scrubber 12 as clearing solvent. With this structure, the waste treatment system can be operated economically.

Next, a waste liquid treatment apparatus according to the second embodiment of the present invention will be described below with reference to FIG. 2.

Figure 2:
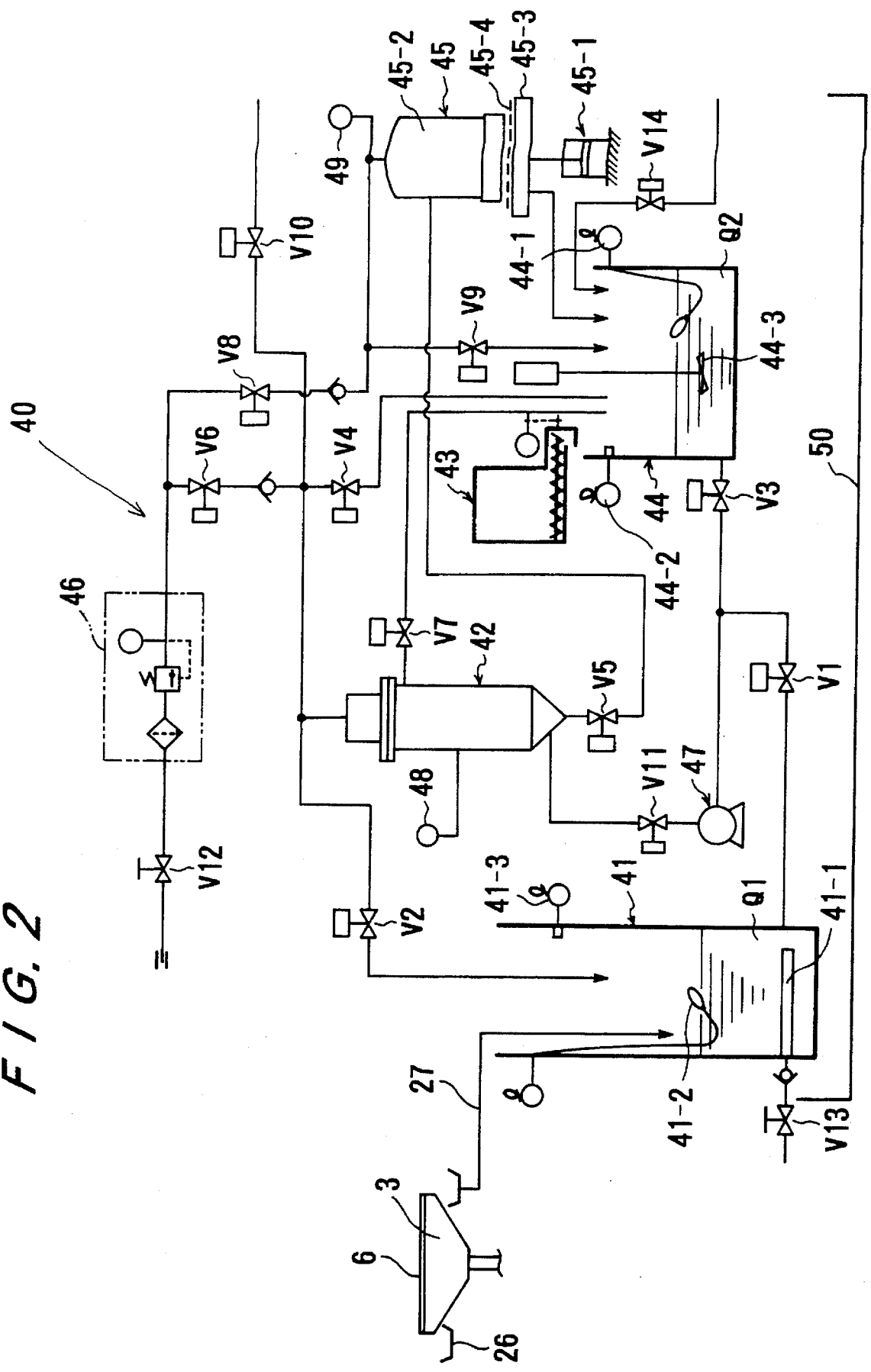
FIG. 2 is a waste liquid treatment apparatus in a waste treatment system according to another embodiment of the present invention.

FIG. 2 is a schematic view showing a waste liquid treatment apparatus 40 of the present invention. The waste liquid treatment apparatus 40 comprises a waste liquid tank 41 for collecting waste liquid discharged from the polishing apparatus 1, a filter 42 for filtering the waste liquid, a filter aid supply device 43 for supplying filter aid such as diatomaceous earth to the filter 42 and a filter aid liquid tank 44 for storing filter aid liquid containing the filter aid. The waste liquid treatment apparatus 40 further comprises a dehydrator 45, a regulator 46 for regulating air pressure for back washing and a pump 47 for supplying waste liquid to the filter 42. The above apparatuses are disposed in an oil pan 50.

Waste liquid Q1 discharged from the polishing apparatus 1 through the waste liquid receiver 26 and the pipe 27 is stored in the waste liquid tank 41. An air supply pipe 41-1 is disposed at the bottom of the waste liquid tank 41 so that pressurized air is ejected into the waste liquid, thereby mixing the waste liquid. Level sensors 41-2 and 41-3 are disposed in the waste liquid tank 41 to detect a level of the waste liquid Q1. Water is supplied to the filter aid liquid tank 44 through a valve V14, and the filter aid suitable to remove solid foreign matter from the waste liquid Q1 is supplied to the filter aid liquid tank 44. The water and the filter aid are mixed in the filter aid liquid tank 44 to prepare filter aid liquid Q2. Level sensors 44-1 and 44-2 are disposed in the filter aid liquid tank 44 to detect a level of the filter aid liquid Q2, and a mixer 44-3 is disposed in the filter aid liquid tank 44. The dehydrator 45 comprises an air cylinder 45-1, a dehydrating column 45-2, a table 45-3 fixed to the upper end of the air cylinder 45-1 and a filter paper 45-4 placed on the table 45-3.

The waste liquid treatment apparatus 40 of the above structure operates as follows: before the waste liquid filtering process of is carried out, a coating process for coating the filter aid on the filter element in the filter 42 is carried out. First, a valve V3, a valve V4 and an air release valve V7 are opened, and a valve V1, a valve V2 and a valve V10 are closed. The pump 47 and the mixer 44-3 are started to operate. Water supplied in advance through the valve V14 in the filter aid liquid tank 44 is supplied into the filter 42. When water begins to be discharged from the valve V4 through the filter element in the filter 42, the filter aid supply device 43 is operated for a predetermined time to supply a certain amount of the filter aid into the filter aid liquid tank 44, thereby making the filter aid liquid Q2. The air release valve V7 is closed and the filter aid liquid Q2 is circulated between the filter 42 and the filter aid liquid tank 44, and filter aid layer is being formed on the filter element.

The filter aid in the filter aid liquid Q2 adheres to the surface of the filter element in the filter 42 and is removed from the filter aid liquid Q2, thus the filter aid liquid Q2 in the filter aid liquid tank 44 is gradually cleaned. When the filter aid liquid Q2 has been cleaned, the filter aid is sufficiently coated on the filter element. Therefore, the mixer 44-3 is stopped, the valve V3 is closed and the air release valve V7 is closed. Thereafter, the process of filtering waste liquid is started.

The filtering process is carried out as follows: by opening the valve V1, the waste liquid Q1 in the waste liquid tank 41 is supplied into the filter 42 by operating the pump 47. When a liquid level of the filter aid liquid tank 44 reaches a predetermined level, the valve V2 is opened and then the valve V4 is closed. The waste liquid Q1 is circulated between the waste liquid tank 41 and the filter 42. In this circulating process, solid foreign matter in the waste liquid Q1 is caught by the filter element of the filter 42 and separated from the waste liquid Q1. When the waste liquid Q1 in the waste liquid tank 41 is cleaned, the valve V10 is opened and the valve V2 is closed, and cleaned waste liquid is discharged. By this drainage, when a liquid level in the waste liquid tank 41 reaches a lowermost level, the valve V2 is opened and the valve V10 is closed.

After a certain amount of solid foreign matter is caught by the filter element in the filter 42, the filtering effect is deteriorated. Therefore, an intermediate back washing process is required to remove solid foreign matter caught by the filter element and the filter aid on the filter element. In the intermediate back washing process, it is confirmed that the liquid level of the filter aid liquid tank 44 reaches a predetermined level, and the pump 47 is stopped. Further, the valve V1 and the valve V2 are closed. Next, a valve V6 is opened, pressurized air is supplied to the filter 42 through the regulator 46. When the pressure in the filter 42 rises to a certain value which is detected by a pressure sensor 48, the air release valve V7 is opened. This state is continued for a certain time (30 to 40 seconds), and hence solid foreign matter caught by the filter element and the filter aid coated on the surface of the filter element in the filter 42 is removed. Thereafter, the valve V6 is closed, and the intermediate back washing process finishes.

After finishing the intermediate back washing process, a process of coating the filter aid is carried out again. In this filter aid coating process, the valve V3, the valve V4 and the air release valve V7 are opened, and the pump 47 and the mixer 44-3 are started to operate. Next, the valve V7 is closed and the filter aid liquid Q2 in the filter aid liquid tank 44 is circulated between the filter aid liquid tank 44 and the filter 42. When the filter aid is caught by the surface of the filter element and the filter aid liquid Q2 is cleaned, the valve V1 is opened, the valve V3 is closed and the mixer 44-3 is stopped. When a liquid level in the filter aid liquid tank 44 reaches a predetermined level, the valve V2 is opened and the valve V4 is closed. With the above operation, the filter aid coating process finishes and the filtering process starts. By the filtering process, solid foreign matter in the waste liquid Q1 is caught by the filter element in the filter 42. After a great amount of solid foreign matters is caught by the filter element, the filtering capacity of the filter element is deteriorated. Therefore, the back washing process for removing solid foreign matter is carried out.

In the back washing process, the air cylinder 45-1 of the dehydrator 45 is actuated, the pump 47 is stopped, and the valve V1 and the valve V2 are closed. Thereafter, the valves V9 and V6 are opened. Pressurized air is supplied from a pressurized air source to the filter 42 through the regulator 46 and the valve V6, and pressure in the filter 42 is detected by the pressure sensor 48. When the pressure in the filter 42 reaches a predetermined value, the valve V5 is opened and liquid in the filter 42 is discharged into the dehydrator 45. When liquid in the filter 42 is completely drained, the valve V6 is closed, and the valve V5 is then closed. Further, the air release valve V7 is opened and remaining pressure in the filter 42 is released. When the pressure in the filter 42 becomes 0 kg/cm$^2$, the valve V7 is closed, and the back washing process finishes. Further, the valve V9 is closed.

After finishing the back washing process, a dehydrating process is carried out by the dehydrator 45. In the dehydrating process, the air cylinder 45-1 is actuated, and then the valve V10 is closed and the valve V8 is opened. Pressurized air is supplied from the pressurized air supply source to the dehydrator 45 through a valve V12, the regulator 46 and the valve V8. When liquid is discharged from the outlet of the dehydrator 45 into the filter aid liquid tank 44, the dehydrating process starts. After air is discharged from the outlet of the dehydrator 45 and a certain time has elapsed, the valve V8 is closed. When the pressure in the dehydrating column of the dehydrator 45 reaches 0 kg/cm$^2$ which is detected by a pressure sensor 49, the valve V9 is opened. Thereafter, the air cylinder 45-1 is actuated, the valve V9 is closed, and the dehydrating process finishes. A dehydrating cake with a low percentage of water content is produced on the filter paper 45-4 placed on the table 45-3. The dehydrating cake is taken out from the dehydrator 45 and the filter paper 45-4 is replaced with a new one.

As described above, before the filtering process, the filter aid liquid Q2 containing the filter aid such as diatomaceous earth is supplied into the filter 42 by the pump 47, and the filter aid is deposited on the surface of the filter element. Therefore, the waste liquid is supplied to the filter element by the pump 47, and solid foreign matter in the waste liquid is effectively caught and removed from the waste liquid. When the amount of solid foreign matter caught by the filter element reaches a predetermined value, the intermediate back washing process and the back washing process are carried out to supply pressurized air to the filter 42 from a direction opposite to the direction of waste liquid supply, whereby solid foreign matter and the filter aid caught by the surface of the filter element are removed. The removed solid foreign matter and the filter aid are supplied to the dehydrator 45 where a low hydrated cake is produced. By the above operation, the filtering operation can be normally carried out for a long time.

The waste treatment system in the polishing apparatus according to the present invention offers the following advantages.

According to the present invention, waste gas discharged from the polishing apparatus is supplied to the scrubber and treated therein. Therefore, the polishing apparatus can be installed in the clean room because a problem of waste gas is solved. Further, waste liquid discharged from the polishing apparatus can be sufficiently and efficiently treated.

By waste gas treatment and waste liquid treatment, solid particles containing abrasive material and particles generated by the polishing operation, and chemical liquid and mist thereof are prevented from being discharged or scattered into the clean room, thus environmental conservation is sufficiently obtainable.

According to one aspect of the present invention, since clearing solvent in the clearing solvent tank of the scrubber is discharged into the waste liquid treatment apparatus and treated, the clearing solvent containing solid particles such as abrasive material and particles generated by the polishing operation can be appropriately treated. Consequently, treatment process for treating the clearing solvent of the scrubber is not required separately and independently, thus lowering construction and running costs of the total system and saving installation space for the total system.

As is apparent from the above description, according to the present invention, waste gas treatment and waste liquid treatment are complementary to each other, the waste gas and the waste liquid discharged from the polishing apparatus can be treated collectively, and air and water which do not contain contaminant can be discharged to the outside of the system. As so-called "waste", only a low hydrated cake can be taken out from one fixed place. Therefore the total waste treatment system can be compact and simple.

Although certain preferred embodiments of the present invention have been shown and described in detail, it should be understood that various changes and modifications may be made therein without departing from the scope of the appended claims.

What is claimed is:

1. An apparatus comprising
   a clean room,
   a polishing apparatus installed in said clean room and including an abrasive cloth for polishing a semiconductor wafer in a polishing operation which produces waste gas and waste liquid,
   a partition wall installed in said clean room and enclosing said polishing apparatus and defining an enclosed space therewithin, and
   a waste treatment system comprising:
   an exhaust duct opening into said enclosed space;
   a scrubber connected to said exhaust duct through an exhauster for scrubbing waste gas discharged from said polishing apparatus;
   a waste liquid receiver provided below said abrasive cloth for receiving the waste liquid produced in the polishing operation; and
   a waste liquid treatment apparatus connected to said waste liquid receiver for treating the waste liquid produced in the polishing operation.

2. An apparatus as recited in claim 1, further comprising a pipe for feeding clearing solvent in a clearing solvent tank of said scrubber to said waste liquid treatment apparatus.

3. An apparatus as recited in claim 1, further comprising a duct for supplying waste gas generated in a waste liquid chamber of said waste liquid treatment apparatus to said scrubber.

4. An apparatus as recited in claim 1, further comprising a pipe for supplying liquid cleaned by said waste liquid treatment apparatus to said scrubber.

5. An apparatus as recited in claim 1, further comprising a damper provided in said exhaust duct, said damper being controlled so as to be closed while the semiconductor wafer is transferred to a next process after finishing of the polishing operation and prior to a polishing operation for another semiconductor wafer.

6. An apparatus as recited in claim 5, wherein
   said polishing apparatus further includes a rotatable turntable, and said abrasion cloth is attached to said rotatable turntable; and
   said damper is controlled so as to be opened or closed in synchronization with rotation or stoppage of said turntable.

7. An apparatus as recited in claim 5, wherein
   said polishing apparatus further includes a turntable to which said abrasive cloth is attached, and a top ring which is horizontally and vertically movable relative to said turntable for holding the semiconductor wafer and pressing the semiconductor wafer against said abrasive cloth; and
   said damper is controlled so as to be opened or closed in synchronization with horizontal or vertical movement of said top ring relative to said turntable.

8. An apparatus as recited in claim 1, wherein said polishing apparatus further includes a horizontal turntable for supporting one of said abrasive cloth and the semiconductor wafer, a top ring for holding the other of said abrasive cloth and the semiconductor wafer and a swinging mechanism for swinging said top ring relative to said horizontal turntable about a vertical axis.

9. An apparatus as recited in claim 1, wherein said polishing apparatus further includes a horizontal turntable for supporting one of said abrasive cloth and the semiconductor wafer, a top ring for holding the other of said abrasive cloth and the semiconductor wafer, and a lifting mechanism for vertically moving said top ring between an operating position in which said abrasive cloth can contact the semiconductor wafer and a raised position in which the semiconductor wafer is separated from said abrasive cloth; and
   said top ring is enclosed within said enclosed space in both said operating position and said raised position.

10. An apparatus comprising
    a clean room,
    a polishing apparatus installed in said clean room and including an abrasive cloth for polishing a semiconductor wafer in a polishing operation which produces waste gas and waste liquid,
    a partition wall installed in said clean room and enclosing said polishing apparatus and defining an enclosed space therewithin, and
    a waste treatment system comprising:
    an exhaust duct opening into said enclosed space; and
    a scrubber connected to said exhaust duct through an exhauster for scrubbing waste gas discharged from said polishing apparatus.

11. An apparatus as recited in claim 10, further comprising a damper provided in said exhaust duct, said damper being controlled so as to be closed while the semiconductor wafer is transferred to a next process after finishing of the polishing operation and prior to a polishing operation for another semiconductor wafer.

12. An apparatus as recited in claim 11, wherein said polishing apparatus further includes a rotatable turntable, and said abrasion cloth is attached to said rotatable turntable; and said damper is controlled so as to be opened or closed in synchronization with rotation or stoppage of said turntable.

13. An apparatus as recited in claim 11, wherein said polishing apparatus further includes a turntable to which said abrasive cloth is attached, and a top ring which is horizontally and vertically movable relative to said turntable for holding the semiconductor wafer and pressing the semiconductor wafer against said abrasive cloth; and said damper is controlled so as to be opened or closed in synchronization with horizontal or vertical movement of said top ring relative to said turntable.

14. An apparatus as recited in claim 10, wherein said polishing apparatus further includes a horizontal turntable for supporting one of said abrasive cloth and the semiconductor wafer, a top ring for holding the other of said abrasive cloth and the semiconductor wafer and a swinging mechanism for swinging said top ring relative to said horizontal turntable about a vertical axis.

15. An apparatus as recited in claim 10, wherein said polishing apparatus further includes a horizontal turntable for supporting one of said abrasive cloth and the semiconductor wafer, a top ring for holding the other of said abrasive cloth and the semiconductor wafer, and a lifting mechanism for vertically moving said top ring between an operating position in which said abrasive cloth can contact the semiconductor wafer and a raised position in which the semiconductor wafer is separated from said abrasive cloth; and said top ring is enclosed within said enclosed space in both said operating position and said raised position.

16. An apparatus comprising a clean room, a polishing apparatus installed in said clean room and including an abrasive cloth for polishing a semiconductor wafer in a polishing operation which produces waste gas and waste liquid, a partition wall installed in said clean room and enclosing said polishing apparatus and defining an enclosed space therewithin, and a waste treatment system comprising:

a waste liquid receiver provided below said abrasive cloth for receiving the waste liquid produced in the polishing operation;

a buffer vessel connected to said waste liquid receiver for collecting the waste liquid;

a precipitation chamber connected to said buffer vessel for separating the waste liquid into solid components and liquid components; and a flocculating agent supply device for supplying flocculating agent to said precipitation chamber to quicken precipitation of the solid components in said precipitation chamber.

17. An apparatus as recited in claim 16, wherein said polishing apparatus further includes a horizontal turntable for supporting one of said abrasive cloth and the semiconductor wafer, a top ring for holding the other of said abrasive cloth and the semiconductor wafer and a swinging mechanism for swinging said top ring relative to said horizontal turntable about a vertical axis.

18. An apparatus as recited in claim 16, wherein said polishing apparatus further includes a horizontal turntable for supporting one of said abrasive cloth and the semiconductor wafer, a top ring for holding the other of said abrasive cloth and the semiconductor wafer, and a lifting mechanism for vertically moving said top ring between an operating position in which said abrasive cloth can contact the semiconductor wafer and a raised position in which the semiconductor wafer is separated from said abrasive cloth; and said top ring is enclosed within said enclosed space in both said operating position and said raised position.

19. An apparatus comprising a clean room, a polishing apparatus installed in said clean room and including an abrasive cloth for polishing a semiconductor wafer in a polishing operation which produces waste gas and waste liquid, a partition wall installed in said clean room and enclosing said polishing apparatus and defining an enclosed space therewithin, and a waste treatment system comprising:

a waste liquid receiver provided below said abrasive cloth for receiving the waste liquid produced in the polishing operation;

a waste liquid tank connected to said waste liquid receiver for collecting the waste liquid;

a filter having a filter element for filtering the waste liquid;

a filter aid supply device for supplying filter aid to said filter element and forming a filter aid layer on said filter element;

a waste liquid supplying device for supplying the waste liquid to said filter element and allowing the cleaned liquid to pass through said filter aid layer; and a back washing device for removing the filter aid layer on said filter element and solid foreign matter caught by said filter element by supplying fluid to said filter element after a certain amount of solid foreign matter is caught by said filter element.

20. An apparatus as recited in claim 19, wherein said polishing apparatus further includes a horizontal turntable for supporting one of said abrasive cloth and the semiconductor wafer, a top ring for holding the other of said abrasive cloth and the semiconductor wafer and a swinging mechanism for swinging said top ring relative to said horizontal turntable about a vertical axis.

21. An apparatus as recited in claim 19, wherein said polishing apparatus further includes a horizontal turntable for supporting one of said abrasive cloth and the semiconductor wafer, a top ring for holding the other of said abrasive cloth and the semiconductor wafer, and a lifting mechanism for vertically moving said top ring between an operating position in which said abrasive cloth can contact the semiconductor wafer and a raised position in which the semiconductor wafer is separated from said abrasive cloth; and said top ring is enclosed within said enclosed space in both said operating position and said raised position.

22. An apparatus as recited in claim 19, further comprising a dehydrator for dehydrating the filter aid and the solid foreign matter removed by said back washing device to form a cake with a low percentage of water content.

23. An apparatus comprising a polishing apparatus including an abrasive cloth for polishing a semiconductor wafer in a polishing operation which produces waste gas and waste liquid, a partition wall enclosing said polishing apparatus and defining an enclosed space therewithin, and a waste treatment system comprising:

an exhaust duct opening into said enclosed space;

a scrubber connected to said exhaust duct through an exhauster for scrubbing waste gas discharged from said polishing apparatus;

a waste liquid receiver provided below said abrasive cloth for receiving the waste liquid produced in the polishing operation;

a waste liquid treatment apparatus connected to said waste liquid receiver for treating the waste liquid produced in the polishing operation; and a pipe for feeding clearing solvent in a clearing solvent tank of said scrubber to said waste liquid treatment apparatus.

24. An apparatus comprising a polishing apparatus including an abrasive cloth for polishing a semiconductor wafer in a polishing operation which produces waste gas and waste liquid, a partition wall enclosing said polishing apparatus and defining an enclosed space therewithin, and a waste treatment system comprising:

an exhaust duct opening into said enclosed space;

a scrubber connected to said exhaust duct through an exhauster for scrubbing waste gas discharged from said polishing apparatus;

a waste liquid receiver provided below said abrasive cloth for receiving the waste liquid produced in the polishing operation;

a waste liquid treatment apparatus connected to said waste liquid receiver for treating the waste liquid produced in the polishing operation; and a duct for supplying waste gas generated in a waste liquid chamber of said waste liquid treatment apparatus to said scrubber.

25. An apparatus comprising a polishing apparatus including an abrasive cloth for polishing a semiconductor wafer in a polishing operation which produces waste gas and waste liquid, a partition wall enclosing said polishing apparatus and defining an enclosed space therewithin, and a waste treatment system comprising:

an exhaust duct opening into said enclosed space;

a scrubber connected to said exhaust duct through an exhauster for scrubbing waste gas discharged from said polishing apparatus;

a waste liquid receiver provided below said abrasive cloth for receiving the waste liquid produced in the polishing operation;

a waste liquid treatment apparatus connected to said waste liquid receiver for treating the waste liquid produced in the polishing operation; and a pipe for supplying liquid cleaned by said waste liquid treatment apparatus to said scrubber.

26. An apparatus comprising a polishing apparatus including an abrasive cloth for polishing a semiconductor wafer in a polishing operation which produces waste gas and waste liquid, a partition wall enclosing said polishing apparatus and defining an enclosed space therewithin, and a waste treatment system comprising:

an exhaust duct opening into said enclosed space;

a scrubber connected to said exhaust duct through an exhauster for scrubbing waste gas discharged from said polishing apparatus;

a waste liquid receiver provided below said abrasive cloth for receiving the waste liquid produced in the polishing operation;

a waste liquid treatment apparatus connected to said waste liquid receiver for treating the waste liquid produced in the polishing operation; and a damper provided in said exhaust duct, said damper being controlled so as to be closed while the semiconductor wafer is transferred to a next process after finishing of the polishing operation and prior to a polishing operation for another semiconductor wafer.

27. An apparatus as recited in claim 26, wherein said polishing apparatus further includes a rotatable turntable, and said abrasive cloth is attached to said rotatable turntable; and said damper is controlled so as to be opened or closed in synchronization with rotation or stoppage of said turntable.

28. An apparatus as recited in claim 26, wherein said polishing apparatus further includes a turntable to which said abrasive cloth is attached, and a top ring which is horizontally and vertically movable relative to said turntable for holding the semiconductor wafer and pressing the semiconductor wafer against said abrasive cloth; and said damper is controlled so as to be opened or closed in synchronization with horizontal or vertical movement of said top ring relative to said turntable.

\* \* \* \* \*